US007392011B1

United States Patent
Jacomb-Hood

(10) Patent No.: US 7,392,011 B1
(45) Date of Patent: Jun. 24, 2008

(54) METHOD AND SYSTEM FOR FLEXIBLY DISTRIBUTING POWER IN A PHASED ARRAY ANTENNA SYSTEM

(75) Inventor: Anthony W. Jacomb-Hood, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 428 days.

(21) Appl. No.: 11/139,872

(22) Filed: May 31, 2005

(51) Int. Cl.
*H04B 7/185* (2006.01)

(52) U.S. Cl. .................... 455/13.4; 455/127.3; 342/368; 343/700 R

(58) Field of Classification Search ................. 342/174, 342/372, 377, 368; 343/700 MS, 853, 700 R; 455/12.1, 13.1–13.4, 103, 127.1–127.3
See application file for complete search history.

(56) References Cited

U.S. PATENT DOCUMENTS

| | | | | |
|---|---|---|---|---|
| 5,826,170 | A * | 10/1998 | Hirschfield et al. | 455/13.4 |
| 5,870,063 | A * | 2/1999 | Cherrette et al. | 343/853 |
| 5,977,910 | A * | 11/1999 | Matthews | 342/368 |
| 6,573,862 | B2 * | 6/2003 | Vail et al. | 342/368 |
| 6,690,326 | B2 * | 2/2004 | Nemit et al. | 342/383 |
| 2002/0077066 | A1 * | 6/2002 | Pehlke et al. | 455/73 |
| 2002/0135513 | A1 * | 9/2002 | Paschen et al. | 342/371 |

OTHER PUBLICATIONS

"IRIDIUM Main Mission Antenna Concept", by J.J. Schuss, et al., IEEE Transactions On Antennas And Propagation, vol. 47, No. 3, Mar. 1999.

* cited by examiner

*Primary Examiner*—Edward Urban
*Assistant Examiner*—Nhan T. Le
(74) *Attorney, Agent, or Firm*—McDermott Will & Emery LLP

(57) ABSTRACT

A power system flexibly distributes power among phased array antenna apertures of a satellite (or other type of platform). By allocating the power provided by a power source among the apertures, if one aperture is not providing useful coverage (due to orientation, light traffic volume, aperture operating frequency and/or polarization, etc.), power being supplied to that aperture may be reallocated to one or more other apertures that are providing useful coverage. To flexibly allocate power among the apertures, power amplifiers and attenuators associated with each antenna element are adjusted to provide a wide range of RF output powers with high efficiency at all output power levels. By increasing power allocation efficiency, the size of the satellite power source may be reduced while appropriate power is still provided.

26 Claims, 4 Drawing Sheets

METHOD AND SYSTEM FOR FLEXIBLY DISTRIBUTING POWER IN A PHASED ARRAY ANTENNA SYSTEM

TECHNICAL FIELD

This disclosure relates to phased array antenna systems and, more particularly, to power distribution for phased array antenna systems.

BACKGROUND

With the advances in wireless technology, satellites such as geo-stationary satellites are used in telecommunication systems to establish communication links across large distances. To produce these links, phased array antennas have been incorporated into some satellites as well as other types of mobile platforms and stationary ground stations. Typically, a phased array antenna has one or more apertures that are assembled from a large number of radiating elements, such as slots or dipoles. By individually controlling a phase shift and attenuation that is applied to each element, predictable beams may be formed and accurately pointed in particular directions. Each aperture is assigned a fixed number of beams and each beam may be pointed in a direction to establish a communication link. For example, a satellite may include four phased array antenna apertures and twelve beams may be assigned to each aperture (for a total of forty-eight beams associated with the satellite). Thus, each of the phased array antenna apertures may point its twelve beams in various directions to establish links. To produce these beams, the satellite includes a power source that provides power to the phased array antenna apertures. The power source is designed with a capacity to simultaneously provide a constant power to the antenna elements in each array. However, due to an electromagnetic characteristic (e.g., operating frequency, polarization, etc.) of an aperture, appropriate coverage may not always be provided. Also, during particular times, one or more of the apertures may be positioned in such an orientation as to not provide useful coverage. Due to these periods of limited coverage, the power provided to the affected aperture (s) is wasted. Additionally, supplying a constant power to the apertures, beam characteristics such as beamwidth and sidelobe levels are less controllable.

SUMMARY OF THE DISCLOSURE

The subject matter disclosed herein solves these problems by flexibly distributing power among phased array antenna apertures of a satellite (or other type of platform). By allocating the power provided by a power source among the apertures, if one aperture is not providing useful coverage (due to orientation, light traffic volume, aperture operating frequency and/or polarization, etc.), power being supplied to that aperture may be reallocated to one or more other apertures that are providing useful coverage. Additionally, by controlling the amount of power that is provided to apertures or portions of apertures, characteristics of the beams produced (e.g., beamwidth, sidelobe level, group delay, radiation power level, etc.) are better controlled. To flexibly allocate power among the apertures, power amplifiers and attenuators associated with each antenna element are adjusted to provide a wide range of RF output powers with high efficiency at all output power levels. By increasing power allocation efficiency, the size of the satellite power source may be reduced while appropriate power is still provided.

In accordance with an aspect of the disclosure, a phased array antenna system includes a signal source that produces two electromagnetic signals for respective transmitting over one of two antenna elements included in the phased array antenna system. The array antenna system also includes a power controller that provides one voltage signal to supply power to one power amplifier that amplifies one of the electromagnetic signals for transmission over the first antenna element. The power controller also provides a second voltage signal to supply power to another power amplifier that amplifies the second electromagnetic signal for transmission over the second antenna element. The power controller provides a DC power that is associated with the voltage signals and is less than the power needed to simultaneously operate the power amplifiers at full power.

In one embodiment, one of the voltage signals provided by the power controller may include a voltage signal to adjust the drain-to-source voltage of one of the power amplifiers. One of the voltage signals provided by the power controller may include a voltage signal to adjust the gate-to-source voltage of one of the power amplifiers. One of the voltage signals provided by the power controller may include a voltage signal to adjust the drain-to-source voltage of one of the power amplifiers and another voltage signal to adjust the gate-to-source voltage of the power amplifier. The signal source may be configured to produce an adjustable electromagnetic signal. The power controller may convert one DC voltage signal into another DC voltage signal. The antenna elements may be included in the same aperture or different apertures. The electromagnetic signals may be the same signal or different signals. The array antenna system may further include an attenuator that attenuates one of the electromagnetic signals prior to transmission over one of the antenna-elements. The power controller may include a DC-to-DC converter.

In accordance with another aspect of the disclosure, a space vehicle includes a phased array antenna system that has a signal source that produces an electromagnetic signal for transmission over antenna elements included in the phased array antenna system. The system also includes transmit modules that respectively provide the electromagnetic signal to the antenna elements. Each of the transmit modules includes an attenuator to respectively attenuate the electromagnetic signal. The system also includes a power controller that provides a voltage signal to supply power to one of the transmit modules and provides another voltage signal to supply power to another one of the transmit modules. The power controller provides a DC power that is associated with the voltage signals and is less than the power needed to simultaneously operate the power amplifiers at full power. The system also includes an array controller that provides one voltage signal to set the attenuation of the attenuator included in one transmit module and to provide a second voltage signal to set the attenuation of the attenuator included in the second transmit module.

In one embodiment, one of the voltage signals to supply power to one of the transmit modules may include a voltage signal to adjust the drain-to-source voltage of a power amplifier included in the transmit module. One of the voltage signals to supply power to one of the transmit modules may include a voltage signal to adjust the gate-to-source voltage of a power amplifier included in the transmit module. One of the voltage signals to supply power to one of the transmit modules may include a voltage signal to adjust the drain-to-source voltage of a power amplifier included in the transmit module and a voltage signal to adjust the gate-to-source voltage of the power amplifier. The power controller may include a DC-to-DC converter. The electromagnetic signal produced by the signal source may be based on an electromagnetic signal previously received by the phased array antenna system. The signal source may be configured to attenuate the electromagnetic signal produced by the signal source. The power controller may provide a group of voltage signals to respectively supply power to a group of the transmit modules and provide another group of voltage signals to respectively supply power to another group of the transmit modules. The power supplied to one group of transmit modules may be different from the power supplied to the other group of transmit modules.

In accordance with another aspect of the disclosure, a method of controlling power consumption of a phased array antenna system includes producing an electromagnetic signal for transmission from the phased array antenna system. The method also includes providing one voltage signal to supply power to a power amplifier that amplifies the electromagnetic signal and provides the amplified electromagnetic signal to an antenna element in the phased array antenna system for transmission. The method also includes providing another voltage signal to supply power to a second power amplifier that amplifies the electromagnetic signal and provides the amplified electromagnetic signal to another antenna element in the phased array antenna system. The voltage signals are provided by a DC power level is less than the power needed to simultaneously operate both power amplifiers at full power.

In one embodiment, the method may also include providing a third voltage signal to control the application of an attenuation to the electromagnetic signal. The voltage signal that supplies power to the first power amplifier may include a voltage signal to adjust the drain-to-source voltage of the first power amplifier. The voltage signal to supply power to the first power amplifier may include a voltage signal to adjust the gate-to-source voltage of the first power amplifier.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

DETAILED DESCRIPTION OF THE EMBODIMENTS

Figure 1:
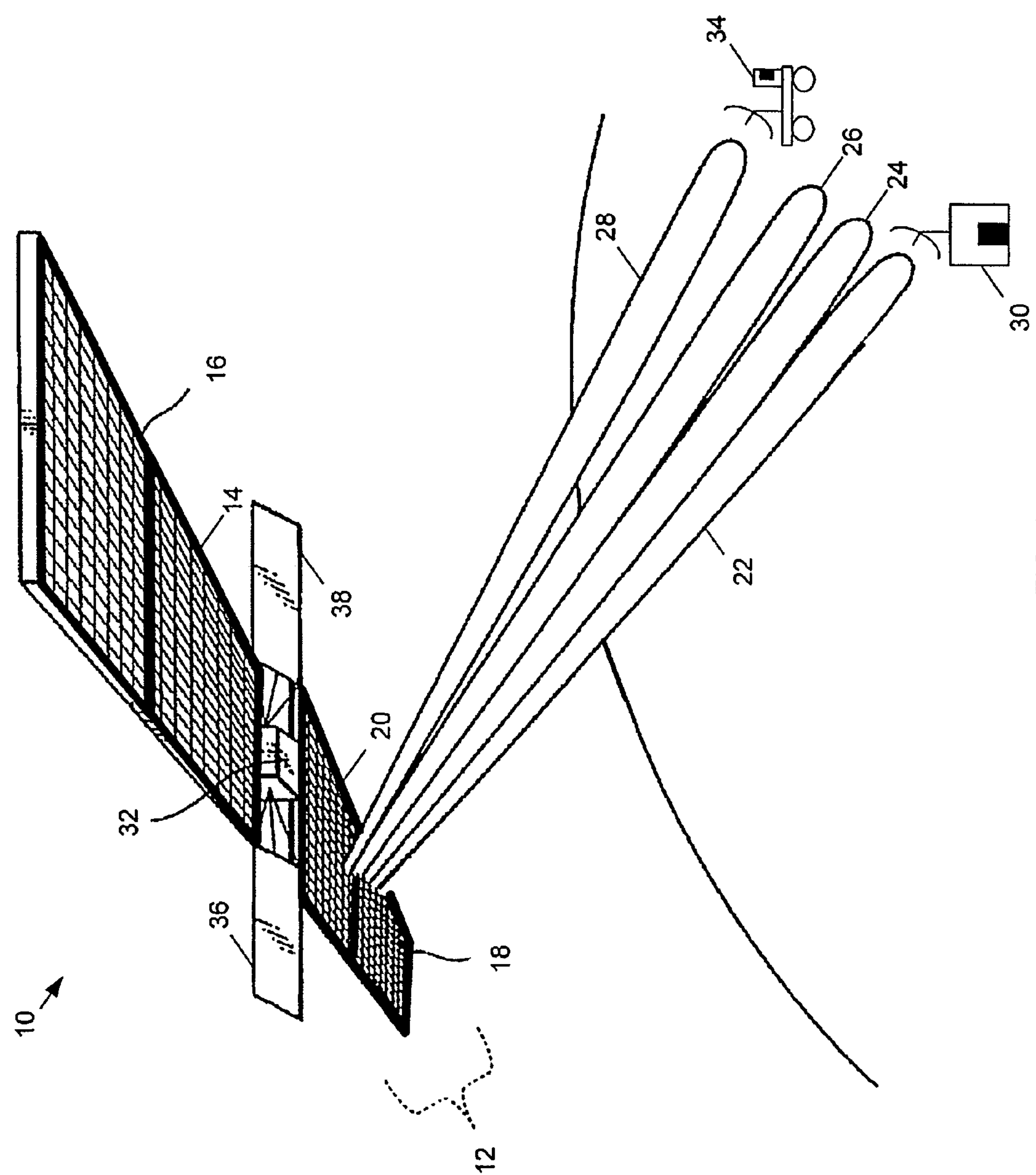
FIG. 1 is a diagrammatic view of a satellite that includes a phased array antenna system configured to produce multiple transmission and/or reception beams.

Referring to FIG. 1, a satellite 10 is shown in a deployed position and includes a phased array antenna system 12 that includes four phased array apertures 14, 16, 18 and 20 that are capable of producing multiple beams. In this representation, phased array apertures 18 and 20 are shown producing four distinct beams 22, 24, 26 and 28. Each of these beams may be used for transmitting or receiving electromagnetic signals to and from locations respectively covered by apertures 18 and 20. For example, beam 22 may be used to receive an electromagnetic signal (e.g., a radio frequency (RF) signal, an optical signal, etc.) that is transmitted from a ground station 30 that is covered by beam 22. To receive the electromagnetic signal on beam 22, phased array aperture 18 (or a portion of the phased array aperture) is designed to operate at one or more frequency bands (e.g., C-band, Ku-band, etc.) within the electromagnetic spectrum in which ground station 30 transmits. Additionally, phased array aperture 18 may be designed to receive electromagnetic signals with one or more polarizations. For example, phased array aperture 18 (or a portion of the phased array aperture) may be designed to operate with polarizations such as linear polarizations (e.g., vertical, horizontal, etc.), circular polarization (e.g., right hand circular, left hand circular, etc.), elliptical polarization, or other similar electromagnetic polarization.

Continuing with the example, after receiving the electromagnetic signal over beam 22, the signal may be processed (e.g., amplified, scaled to another frequency band, etc.) by hardware onboard satellite 10. For example, a C-band, vertically polarized signal may be received from ground station 30 over beam 22. Once received, circuitry in a payload module 32 may process the signal for transmission to another location that is covered by satellite 10. For example, the signal may be amplified, scaled to a frequency within the Ku-band, and transmitted with a horizontal polarization. In this scenario, the processed signal is transmitted over beam 28 to a mobile station 34 (e.g., a car, a truck, etc.). To provide electrical power to the circuitry included in payload module 32 and hardware in antenna apertures 14, 16, 18 and 20, a pair of solar panels 36 and 38 collect and convert sunlight into electrical energy.

Figure 2:
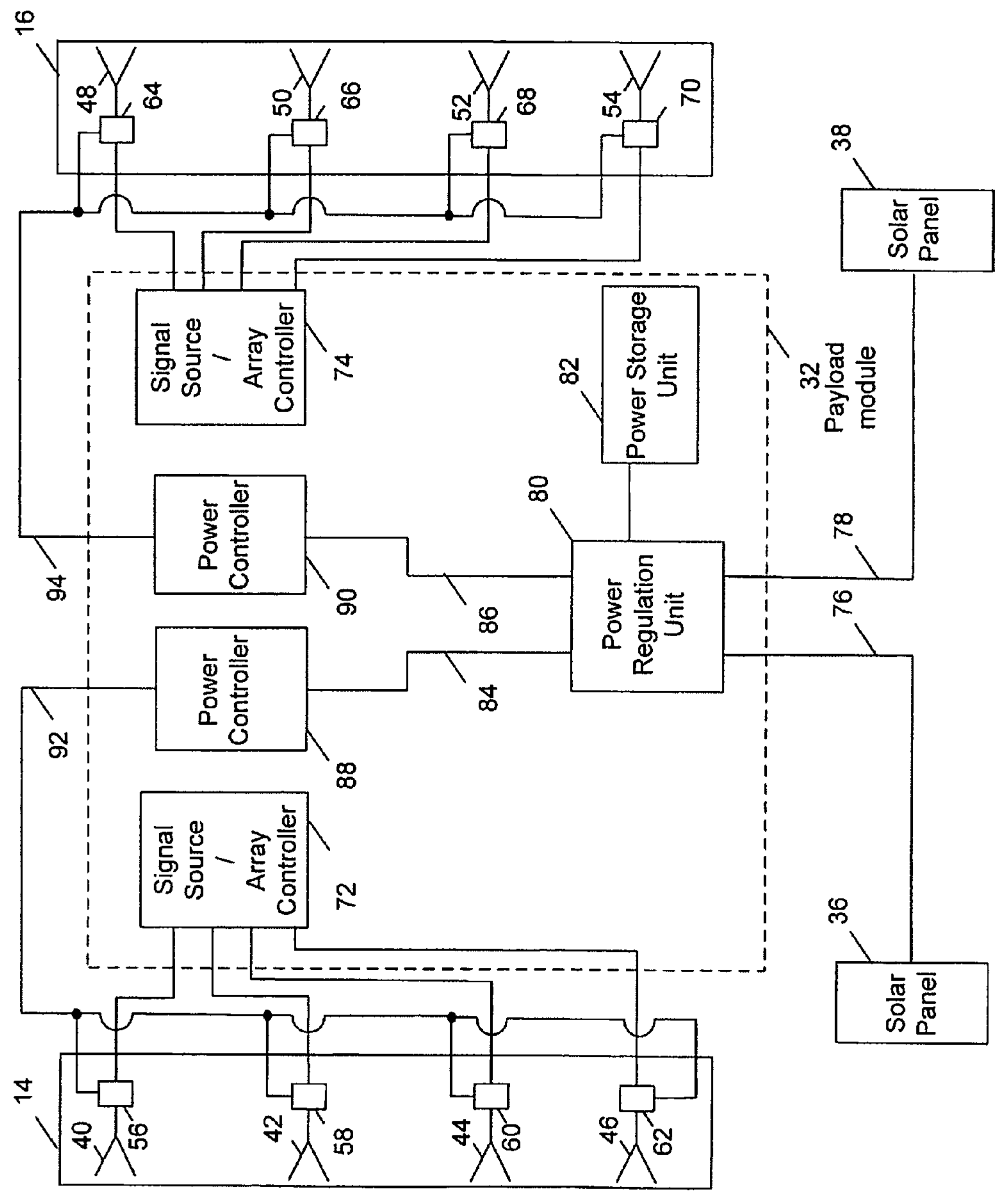
FIG. 2 is a diagrammatic view of a flexible power distribution system that allocates power among the apertures included in the phased array antenna system shown in FIG. 1.

Referring also to FIG. 2, a block diagram representing a portion of payload module 32 and phased array apertures 14 and 16 is shown. Each phased array aperture includes antenna elements that in aggregate form the respective phased array apertures. For illustrative purposes, only four antenna elements are shown in phased array aperture 14 and phased array aperture 16. In particular, phased array aperture 14 includes antenna elements 40, 42, 44, and 46 while phased array aperture 16 includes antenna elements 48, 50, 52, and 54. In this example, both phased array apertures are configured to transmit electromagnetic signals. Although, as previously shown, satellite 10 may include phased array apertures configured to receive signals. Each of the antenna elements (e.g., elements 40-54) may be implemented with identical or dissimilar antenna designs (e.g., dipoles, spirals, etc.) that are well known to a person of skill in the art of antenna design and antenna system design. In some implementations, one or more of the antenna elements may be a source to one or more reflector antennas.

To transmit signals, each antenna element 40-54 is respectively connected to a transmit module 56, 58, 60, 62, 64, 66, 68 and 70 that conditions signals for transmission over the antenna elements. For example, the transmit modules may apply phase shifts to the transmission signals to steer a beam to a particular angular position. Transmit modules 56-70 also amplify the signals for transmission by respective antenna elements 40-54. For ease of illustration, payload module 32 is shown to include two signal source/array controllers 72, 74 that respectively provide signals to transmit modules 56-70 for transmission by antenna elements 40-54. Additionally, the signal source/array controllers 72, 74 respectively provide control signals to transmit modules 56-70. In this exemplary design, the signal source/array controllers are respectively combined into common units. However, in other designs the signal source/array controllers may be separated into separate units. Furthermore, in some designs one signal source and/or one array controller may provide respective signals to each of the antenna elements and transmit modules. Along with generating transmission signals onboard, payload module 32 typically includes hardware for processing signals (for re-transmission) that are received by one or more or the phased array apertures (that are designated as receive apertures). For example, payload module 32 may include circuitry that conditions (e.g., amplifies, changes frequency, changes polarization, etc.) the received signals for re-transmission over one or more of the apertures (e.g., aperture 18).

To provide power to transmission modules 56-70 (and other hardware), solar panels 36 and 38 collect sunlight with large arrays of solar cells and convert the sunlight into electrical energy. The electrical energy is sent over respective conductors 76, 78 (e.g., conducting traces, cables, etc.) to a power regulation unit 80 that directs the electrical energy for storage and distributes the electricity to transmission modules 56-70 (along with other hardware onboard satellite 10). To store the electrical energy collected by solar panels 36 and 38, power regulator unit 80 directs the electrical energy to a power storage unit 82 that includes e.g., a group of rechargeable batteries for storing the electrical energy. In other arrangements, other types of power storage techniques known to one of skill in the art are implemented in power storage unit 82. By storing the electrical energy in power storage unit 82, power may be provided to transmission modules 56-70 (along with portions of payload module 32) during periods when solar panels 36, 38 are not producing electricity. For example, when satellite 10 is eclipsed from the sun, power regulation unit 80 may direct electrical power from power storage unit 82 to the transmit modules. During time periods when the sun is not obstructed, the electrical energy produced by solar panels 36 and 38 may be directed to the transmit modules (and other portions of satellite 10).

Power regulation unit 80 provides power (from solar panels 36, 38 or power storage unit 82) over conductors 84 and 86 to respective power controllers 88 and 90. Typically the electrical power is provided to power controllers 88 and 90 at a relatively large direct current (DC) voltage (e.g., 70 volts) and the electrical power is delivered over conductors 84 and 86 at relatively low currents. Power controllers 88 and 90 distribute the power from power regulation unit 80 to transmit modules 56-70 over cables 92 and 94. In this arrangement cable 92 provides signals to transmit modules 56-62 while cable 94 provides signals to transmit modules 64-70. However, in some arrangements cables 92 and 94 may respectively include a number of conductors to provide separate signals to each transmit module or groups of transmit modules. Typically power controllers 88 and 90 include components and circuitry (e.g., DC-to-DC converters) that convert the large voltage signal (e.g., 70 volt DC signal) received from power regulation unit 80 to a lower voltage signal (e.g., 5-10 volt DC signal). These lower voltage signals are provided to transmit modules 56-70 for supplying power and preparing transmissions signals provided to the transmit modules that are described in detail below.

By providing the DC voltage signals, the power controllers 88, 90 control power distribution from solar panels 36, 38 (or power storage unit 82) to transmit modules 56-70. Allocation of the available electrical power between apertures (e.g., aperture 14, 16) may be based upon the state of satellite 10 (e.g., coverage due to orientation, coverage due to aperture frequency, coverage due to aperture polarization, etc.), communication traffic volume, or a situation that calls for uniform or dissimilar power distribution within a single aperture. For example, phased array aperture 14 may have an orientation that provides less than useful coverage. In such a scenario, power controllers 88 and 90 may allocate more power to phased array aperture 16 to provide additional beams or to adjust the beam power to increase capacity of phased array aperture 16. By re-allocating the power being consumed by phased array aperture 14 during the period of reduced utility, the power is more efficiently consumed. Additionally, by appropriately conserving power, the finite pool of power produced on satellite 10 (i.e., power provided by solar panels 36, 38 and battery unit 82) is not wasted. Furthermore, due to more efficient power consumption, the power storage capacity and/or power production capacity of satellite 10 may be reduced. The power may also be allocated based on the needs of each aperture to perform. For example, more power may be budgeted to phased array aperture 14 due to increased communication traffic in the area covered by that aperture. Furthermore, by providing more power to particular aperture regions, the beams produced by the apertures may be configured for radiation characteristics (e.g., radiation patterns, sidelobe patterns, beamwidth, group delay, radiation power per element, etc.). For example, transmit modules 58 and 60 may be budgeted for more power so that antenna elements in the central region of phased array aperture 14 transmit stronger signals to produce a beam with a particular shape.

To control power distribution, power controllers 88 and 90 respectively provide adjustable DC voltage signals over cables 92 and 94 to transmit modules 56-70 for controlling the transmissions of the respective antenna elements 40-70. In this example, power controller 88 provides the same DC voltage signal over cable 92 to transmit modules 56-62 and power controller 90 provides the same DC voltage signal over cable 94 to transmit modules 64-70. However, in other embodiments individual DC voltage signals may be sent to one or more of the transmit modules or to groups of transmit modules. For example, power controller 88 may send individual DC voltage signals to transmit modules 56-62 to individually control the voltage biasing of amplifiers in each module. Power controller 88 may also send a DC voltage signal to a group of transmit modules (e.g., transmit modules 58 and 60) and a different voltage to another group of transmit modules (e.g., transmit modules 56 and 62). Similarly, power controller 90 may send a DC voltage signal to control biasing of an individual or a group of transmit modules (e.g., transmit modules 66, 68 and 70).

By controlling the operation of each individual transmit module (or groups of transmit modules), power controllers 88 and 90 flexibly distribute power to the phased array apertures (or portions of the phased array apertures). For example, if the frequency band, polarization, or orientation of phased array antenna aperture 16 provides only limited coverage, power controller 90 may reduce the amount of power that is distributed to transmit modules 64, 66, 68, and 70. Accordingly, this conserved DC power may be directed by power controller 88 to transmit modules 56, 58, 60, and 62. Thereby, the total power required is less than operating all of the apertures at their respective maximum power levels. By supplying partial power to some modules and re-directing this DC power, additional coverage may be provided by phased array aperture 14. Furthermore, by dynamically allocating power among the apertures as needed, a constant power does not need to be provided simultaneously to each antenna element. With this reduced need for power, the power providing requirements of the satellite 10 may be reduced. For example, solar panels 36 and 38 may be reduced in size. The size of power storage unit 82 may also be reduced. Thus, power capacity may be reduced without reducing the over-all functionality of satellite 10. By reducing the size of portions of satellite 10 (e.g., a power subsystem), weight and mass are correspondingly reduced to produce a lighter, more efficient satellite that is less costly. Additionally, by allocating the DC power among the apertures (or portions of apertures) based on factors such as aperture coverage and communication capacity, communication traffic demands may be met while operating within the available DC power budget. In another example, power may be flexibly distributed among transmit modules 56-70 to control transmit beam characteristics. For example, more DC power may be distributed among antenna elements located near the center of a phased array aperture (e.g., antenna elements 42 and 44) and less power provided to antenna elements located at peripheral regions of the phased array aperture (e.g. antenna elements 40 and 46). By providing power levels dependent on antenna element location, the angular width of the transmit beams may be shaped along with other beam characteristics such as sidelobe patterns and levels.

Various techniques known to one skilled in the art of telecommunications and electronics may be incorporated into power controllers 88 and 90 for controlling the allocation of the DC power that is provided by solar panels 36, 38 and power storage unit 82. For example, wireless circuitry may be incorporated into payload module 32 so that instructions may be sent to satellite 10 for allocating the DC power. The received instructions may direct power allocation to one or more of the apertures at particular times or under certain circumstances (e.g., orientation of satellite 10, communication traffic volume, etc.). Power controller 88 and 90 may also be designed for more autonomous allocation of DC power. For example, signals provided from sensors embedded in satellite 10 may be used to detect orientation changes in the satellite and trigger a re-allocation of DC power among the phased array apertures.

Figure 3:
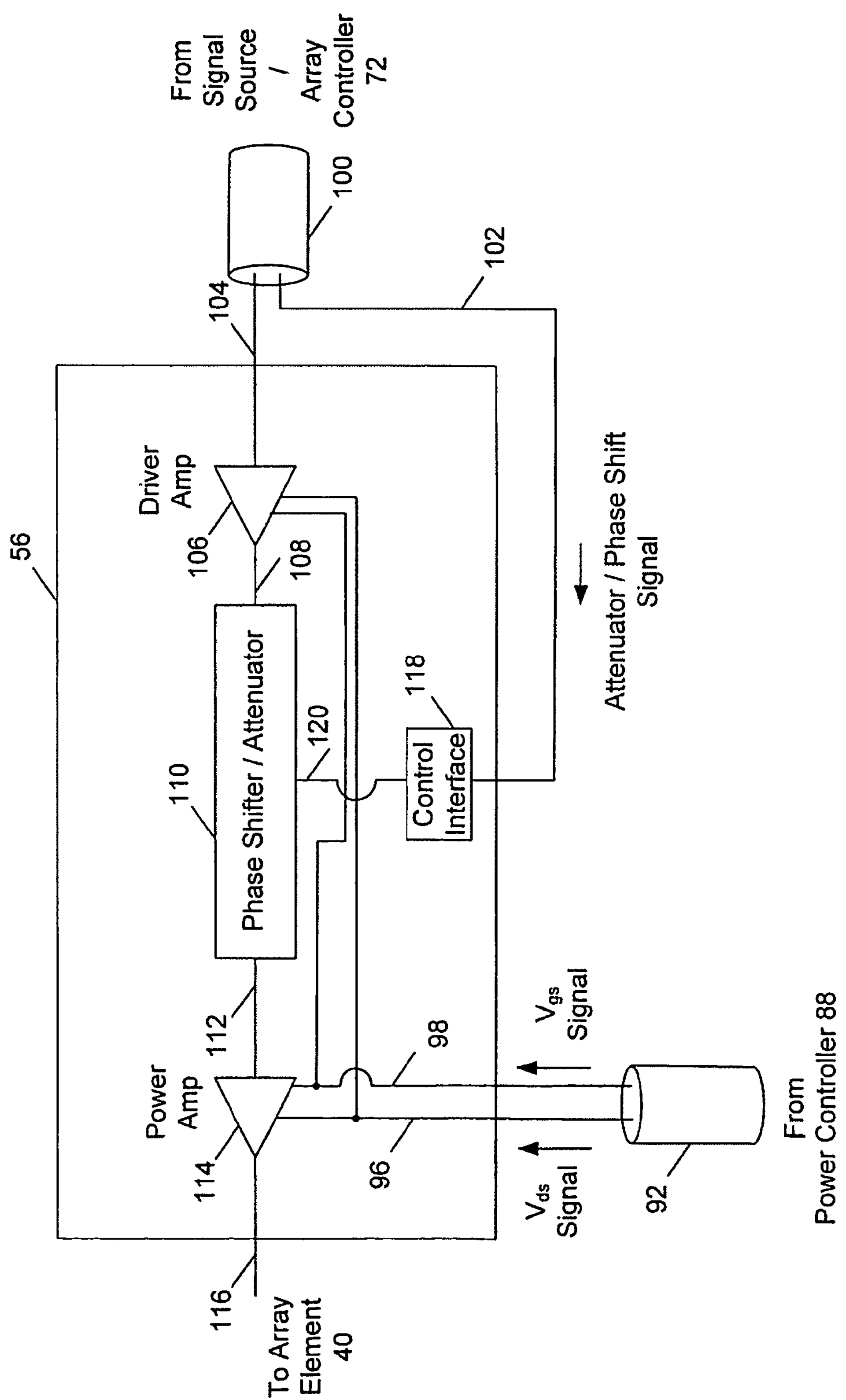
FIG. 3 is a diagrammatic view of a controllable transmit module that conditions signals for transmission over one of the phased array antenna elements shown in FIG. 2.

Referring to FIG. 3, an exemplary design for transmit module 56 is represented in a block diagram. A similar design may incorporated into transmit modules 58-70. In this example, signals are provided by power controller 88 and signal source/array controller 72 to control the operation of transmit module 56. Cable 92 includes two conductors 96 and 98 that provide signals to transmit module 56 from power controller 88 that control the amount of DC voltage that is allocated to the transmit module. Both of these signals provide power to amplifiers that amplify the transmission signal prior to being radiated by antenna element 40. By controlling the amount of DC voltage provided for amplifying, power may be allocated among the phased array apertures (or portions of the phased array apertures) to provide sufficient coverage and communication capacity. A cable 100 that connects signal source/array controller 72 to transmit module 56 also provides two signals. Conductor 102 (included in cable 100) provides a signal that controls the amount of attenuation and phase shift that is applied to the transmission signal that is provided by a conductor 104. While conductors 102 and 104 are represented as single conducting lines, it is understood that either or both conductors may include multiple conducting lines.

In this example, transmission signals are provided to transmit module 56 by signal source/array controller 72 (via conductor 104). A driver amplifier 106 receives the signal, amplifies the signal and provides the amplified signal over a conductor 108 to a phase shifter/attenuator 110. After the amplified signal is phase shifted (e.g., for beamforming) and/or attenuated, the signal is provided over a conductor 112 to a power amplifier 114 that amplifies the signal for transmission by antenna element 40. For transmit module 56, the amplified signal is sent over a conductor 116 from power amplifier 114 to antenna element 40 for transmission.

In this example, conductor 102 provides a signal to a control interface 118 (e.g., an application-specific integrated circuit (ASIC)) to set the amount of attenuation (and/or phase shift) that is applied to the transmission signal from signal source/array controller 72. For example, the amount of attenuation may be based on the voltage level of the signal received over conductor 102. In other arrangements, a digital signal (e.g., a binary word) that designates the attenuation amount may be received by control interface 118 (over conductor 102). Once the amount of attenuation is determined, a signal (e.g., a digital signal containing a binary number) is sent over a conductor 120 to phase shifter/attenuator 110 that applies a phase shift and/or an attenuation to the transmission signal from signal source/array controller 72. Various types of attenuators may be implemented in phase shifter/attenuator 110 to attenuate the signals sent from signal source/array controller 72. For example, a binary number contained in the signal sent from control interface 118 may cause one or more switches to close such that the transmission signal passes through an attenuator (or group of attenuators) included in phase shifter/attenuator 110. By controlling the amount of attenuation applied, the power level of the transmission signal is set so antenna element 40 emits an appropriate signal (e.g., for beamshaping, setting sidelobe level, etc.).

By controlling the amount of gate and drain bias voltage that is provided to power amplifier 114, the available maximum output power and DC power consumption is controlled. Similarly, by controlling the gate and drain bias voltage(s) provided to driver amplifier 106, the maximum output power and DC power consumption is controllable. In this example, the voltage signal provided on conductor 96 to power amplifier 114 and driver amplifier 106 provides the drain voltage to the amplifiers. In particular, the voltage signal is used to provide a drain-to-source voltage (i.e., $V_{ds}$) across the drain and source leads of power amplifier 114 and driver amplifier 106. By varying the voltage signal provided on conductor 96, the output power and power consumption for power amplifier 114 and driver amplifier 106 is controllable.

The voltage signal provided by conductor 98 may also be used to control the current that flows through power amplifier 114 and driver amplifier 106. By using this voltage signal provided by conductor 98 to set the gate-to-source voltage (i.e., $V_{gs}$) of the amplifiers, the operations of power amplifier 114 and driver amplifier 106 are also controlled. In other implementations, the biasing voltages may be provided to either power amplifier 114 or driver amplifier 106 for a period of time (or fixed for all operations). For example, either $V_{ds}$ or $V_{gs}$ may be held at constant levels for driver amplifier 106. Either of the amplifiers may also be self-biased. By varying $V_{ds}$ and $V_{gs}$, the amount of power consumed by power amplifier 114 is controlled. Correspondingly, with improved control of the power consumption, the efficiency of transmit module 56 improves. Expanding the power consumption control and the attenuation control to transmit modules 58-70, the efficiency of both phased array apertures 14 and 16 may be improved.

Figure 4:
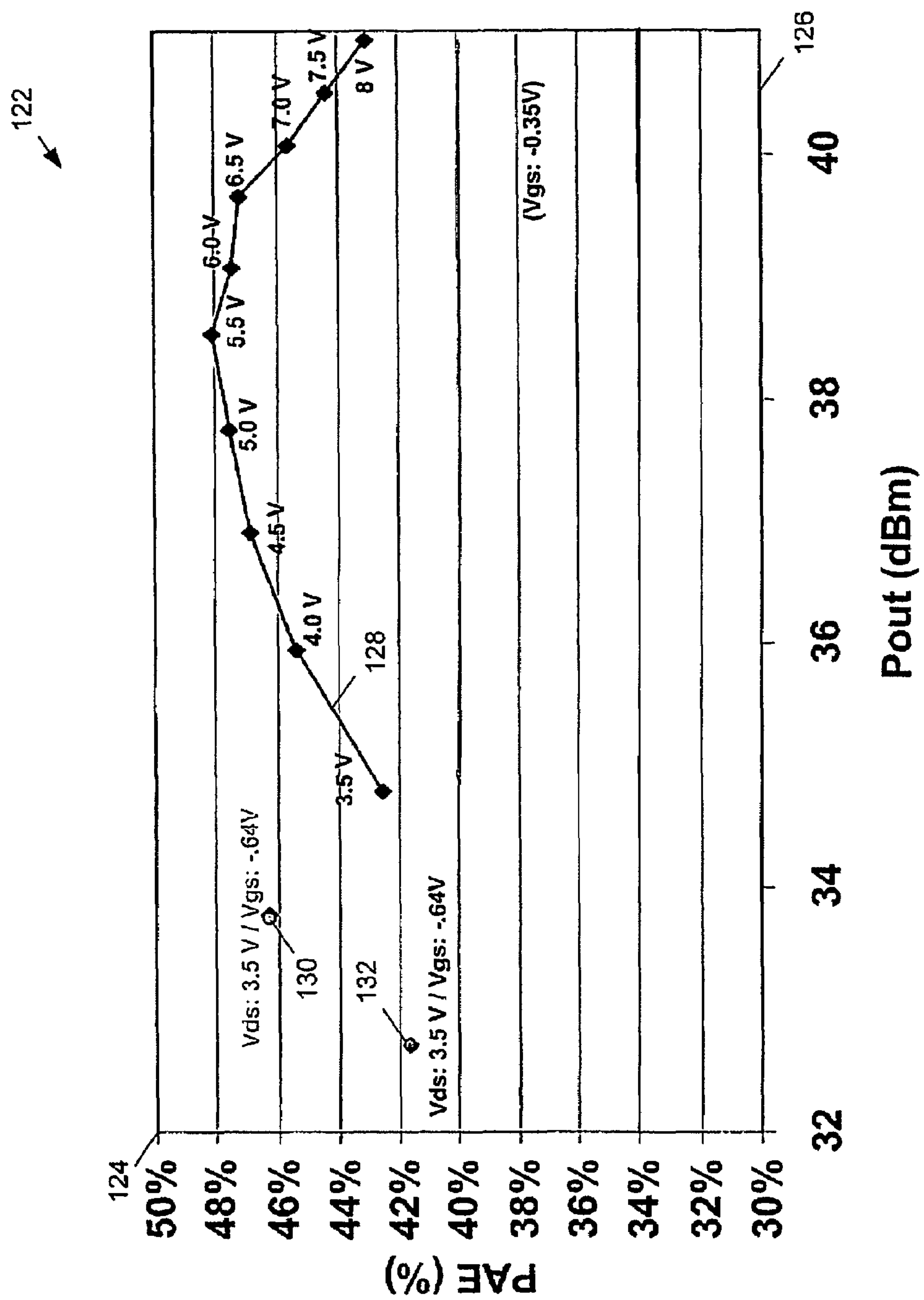
FIG. 4 is a chart that presents efficiency versus output signal power of a controllable power amplifier included in the transmit module shown in FIG. 3.

Referring to FIG. 4, a chart 122 presents the improved efficiency of a power amplifier (e.g., power amplifier 114) that is used by one of the transmit modules to condition transmission signals. Efficiency is represented on y-axis 124 by percent power-added-efficiency (PAE). For an amplifier such as power amplifier 114, PAE may be defined as the ratio of output signal power minus input signal power (both at a particular frequency (e.g., an RF transmission frequency)) to the product of the total DC current and voltage that is supplied to the amplifier. In chart 122 PAE is presented as a function of the output signal power of power amplifier 114. In particular, a range of output signal power in units of decibels referenced to 1 milli-watt (dBm) is presented on the x-axis 126.

By adjusting the voltages that control the supply voltage provided to power amplifier 114 (i.e., $V_{ds}$) and the current flowing through the power amplifier (i.e., $V_{gs}$), a relatively high efficiency is achieved. A trace 128 on chart 120 represents an achievable efficiency level of power amplifier 114 for output power signals between 35 to 41 dBm. Trace 128 presents that PAE may be held over 42% across this wide range of output power. In this example, to provide this PAE, $V_{gs}$ is set to −0.35 volt DC and $V_{ds}$ is varied between 3.5 volts DC and 8.0 volts DC. By adjusting the supply voltage that is provided to power amplifier 114, the efficiency is held at a relatively high level (e.g., between 42% and 48%) for a wide output signal range.

By adjusting the current that flows through power amplifier 114 (by varying $V_{gs}$), along with the supply voltage (by varying $V_{ds}$), the efficiency of the power amplifier may extend across a broader range of output signals. Referring to a data point 130 on chart 120, by adjusting $V_{gs}$ for −0.64 volt DC and $V_{ds}$ for 3.5 volt DC, a PAE level over 46% is achieved for an output signal power of approximately 34 dBm. Extending the range even further at data point 132, for an output signal power of approximately 33 dBm, the efficiency of power amplifier 108 reduces to only slightly below 42% for these adjustments to $V_{gs}$ and $V_{ds}$. By controlling the supply voltage of power amplifier 114 (by adjusting $V_{ds}$) and the current flowing through the power amplifier (by adjusting $V_{gs}$), a relatively high efficiency is provided (over 42%) for a large range of output signal power. Correspondingly, the power levels of signals transmitted by the antenna elements (e.g., antenna element 40) may be controlled for providing particular transmission parameters (e.g., beam shape, radiation pattern, sidelobe levels, etc.).

In the exemplary transmit module design described above, field-effect transistor (FET) circuitry was implemented for amplifying the electromagnetic signals for transmission. However, in some arrangements bipolar junction transistor (BJT) circuitry or a combination of FET and BJT circuitry may be implemented in one or more of the transmit modules to provide a similar functionality.

By allocating the DC power among phased array apertures 14 and 16, power controllers 88 and 90 (in conjunction with signal source/array controllers 72 and 74) control the transmissions from satellite 10 along with power consumption. By controlling power distribution to the phased array apertures, power may be directed to one or more particular apertures (or portions of an aperture) that have been tasked to handle a large volume of communication signals. Accordingly, power controllers 88 and 90 may reduce the power wasted on phased array apertures that are not oriented appropriately or do not operate within the needed frequency band (e.g., Ku-band, Ka-band, C-band, etc.) or needed polarization (e.g., linear, circular, elliptical, etc.). The array controller portions of signal source/array controllers 72 and 74 also control the attenuation of the transmission signals that are radiated from the phased array apertures. By attenuating transmission signals associated with particular antenna elements or portions of the phased array apertures, transmission beams may be produced with controllable characteristics (e.g., beamwidth, sidelobe pattern, group delay, power radiation level, etc.). Additionally, by efficiently distributing power, the size of a satellite power subsystem may be reduced while still providing appropriate power for full satellite capabilities without the need to supply maximum power to all elements in the phased array antenna system.

A number of implementations have been described. Nevertheless, it will be understood that various modifications may be made. Accordingly, other implementations are within the scope of the following claims.

What is claimed is:

1. An array antenna system, comprising:

a signal source configured to produce a first and second electromagnetic signal for transmission over a first antenna element and a second antenna element included in the array antenna system; and a power controller configured to provide a first voltage signal to supply power to a first power amplifier that is configured to amplify the first electromagnetic signal for transmission over the first antenna element and to provide a second voltage signal to supply power to a second power amplifier that is configured to amplify the second electromagnetic signal for transmission over the second antenna element, wherein the power controller is configured to provide a DC power associated with the first and second voltage signal based on a communication state associated with the array antenna system, and wherein the provided DC power is less than the power needed to simultaneously operate the first and second power amplifiers at full power.

2. The array antenna system of claim 1, wherein the first voltage signal provided by the power controller includes a voltage signal to adjust the drain-to-source voltage of the first power amplifier.

3. The array antenna system of claim 1, wherein the first voltage signal provided by the power controller includes a voltage signal to adjust the gate-to-source voltage of the first power amplifier.

4. A phased array antenna system, comprising:

a signal source configured to produce a first and second electromagnetic signal for transmission over a first antenna element and a second antenna element included in the phased array antenna system; and a power controller configured to provide a first voltage signal to supply power to a first power amplifier that is configured to amplify the first electromagnetic signal for transmission over the first antenna element and to provide a second voltage signal to supply power to a second power amplifier that is configured to amplify the second electromagnetic signal for transmission over the second antenna element, wherein the power controller is configured to provide a DC power associated with the first and second voltage signal, and wherein the provided DC power is less than the power needed to simultaneously operate the first and second power amplifiers at full power, and wherein the first voltage signal provided by the power controller includes a first voltage signal to adjust the drain-to-source voltage of the first power amplifier and a second voltage signal to adjust the gate-to-source voltage of the first power amplifier.

5. The array antenna system of claim 1, wherein the signal source is configured to produce an adjustable first electromagnetic signal.

6. The array antenna system of claim 1, wherein the power controller converts a first DC voltage signal to a second DC voltage signal.

7. The array antenna system of claim 1, wherein the first antenna element and the second antenna element are included in the same aperture.

8. The array antenna system of claim 1, wherein the first antenna element and the second antenna element are located in different apertures.

9. The array antenna system of claim 1, wherein the first electromagnetic signal is different from the second electromagnetic signal.

10. The array antenna system of claim 1, further comprising:

an attenuator configured to attenuate the first electromagnetic signal prior to transmission over the first antenna element.

11. The array antenna system of claim 1, wherein the power controller includes a DC-to-DC converter.

12. The array antenna system of claim 1, wherein the first voltage signal provided by the power controller includes a voltage signal to adjust a bipolar transistor.

13. A space vehicle, comprising:

a phased array antenna system including;

a signal source configured to produce an electromagnetic signal for transmission over antenna elements included in the phased array antenna system, a plurality of transmit modules configured to respectively provide the electromagnetic signal to the antenna elements, wherein each transmit module includes an attenuator configured to respectively attenuate the electromagnetic signal, a power controller configured to provide a first voltage signal to supply power to a first transmit module and a second voltage signal to supply power to a second transmit module, wherein the power controller is configured to provide a DC power associated with the first and second voltage signal, wherein the provided DC power is less than the power needed to simultaneously operate the first and second power amplifiers at full power, and an array controller configured to provide a first voltage signal to set the attenuation of a first attenuator included in the first transmit module and to provide a second voltage signal to set the attenuation of a second attenuator included in the second transmit module.

14. The space vehicle of claim 13, wherein the first voltage signal to supply power to the first transmit module includes a voltage signal to adjust the drain-to-source voltage of a power amplifier included in the first transmit module.

15. The space vehicle of claim 13, wherein the first voltage signal to supply power to the first transmit module includes a voltage signal to adjust the gate-to-source voltage of a power amplifier included in the first transmit module.

16. The space vehicle of claim 13, wherein the first voltage signal to supply power to the first transmit module includes a voltage signal to adjust the drain-to-source voltage of a power amplifier included in the first transmit module and a voltage signal to adjust the gate-to-source voltage of the power amplifier.

17. The space vehicle of claim 13, wherein power controller includes a DC-to-DC converter.

18. The space vehicle of claim 13, wherein the electromagnetic signal produced by the signal source is based on an electromagnetic signal previously received by the phased array antenna system.

19. The space vehicle of claim 13, wherein the signal source is configured to attenuate the electromagnetic signal produced by the signal source.

20. The space vehicle of claim 13, wherein the power controller provides a first group of voltage signals to respectively supply power to a first group of transmit modules and provides a second group of voltage signals to respectively supply power to a second group of transmit modules, wherein the power supplied to the first group of transmit modules is different from the power supplied to the second group of transmit modules.

21. A method of controlling power consumption of an array antenna system, comprising:

producing an electromagnetic signal for transmission from the array antenna system;

providing a first voltage signal to supply power to a first power amplifier that is configured to amplify the electromagnetic signal and provide the amplified electromagnetic signal to a first antenna element in the array antenna system for transmission; and providing a second voltage signal to supply power to a second power amplifier that is configured to amplify the electromagnetic signal and provide the amplified electromagnetic signal to a second antenna element in the array antenna system, wherein the first and second voltage signal are provided by a DC power level based on a communication state associated with the array antenna system, and wherein the provided DC power level is less than the power needed to simultaneously operate the first and second power amplifiers at full power.

22. The method of claim 21, further comprising:

providing a third voltage signal to control the application of an attenuation to the electromagnetic signal.

23. The method of claim 21, wherein providing the first voltage signal to supply power to the first power amplifier includes providing a voltage signal to adjust the drain-to-source voltage of the first power amplifier.

24. The method of claim 21, wherein providing the first voltage signal to supply power to the power amplifier includes providing a voltage signal to adjust the gate-to-source voltage of the first power amplifier.

25. The array antenna system of claim 1, wherein the array antenna system is a phased array antenna system.

26. The method of claim 21, wherein the array antenna system is a phased array antenna system.

* * * * *